United States Patent

Unger

[11] 3,935,563
[45] Jan. 27, 1976

[54] COMPUTER FOOTPRINT FILE

[75] Inventor: Robert A. Unger, El Cajon, Calif.

[73] Assignee: The United States of America as represented by the Secretary of the Navy, Washington, D.C.

[22] Filed: Jan. 24, 1975

[21] Appl. No.: 543,720

[52] U.S. Cl. ............................................. 340/172.5
[51] Int. Cl.² ........................................ G06F 11/00
[58] Field of Search ..................... 340/172.5; 444/1

[56] References Cited
UNITED STATES PATENTS

| | | | |
|---|---|---|---|
| 3,551,659 | 12/1970 | Forsythe | 444/1 |
| 3,588,835 | 6/1971 | Enabnit | 340/172.5 |
| 3,588,837 | 6/1971 | Rash et al. | 340/172.5 |
| 3,593,297 | 7/1971 | Kadner | 340/172.5 |
| 3,644,936 | 2/1972 | Holtwick et al. | 444/1 |
| 3,707,725 | 12/1972 | Dellheim | 444/1 |
| 3,711,863 | 1/1973 | Bloom | 444/1 |
| 3,721,961 | 3/1973 | Edstrom et al. | 340/172.5 |

Primary Examiner—Raulfe B. Zache
Attorney, Agent, or Firm—Richard S. Sciascia; Ervin F. Johnston; John Stan

[57] ABSTRACT

Apparatus for keeping track of the progress of a computer program by selecting specific operand and/or instruction references, comprising means for accessing an operand and an instruction reference. Means are connected to a memory data register of the computer and to the two accessing means for selecting one of a specific operand or instruction reference which is to be monitored. A random-access memory (RAM), has three inputs, including one from a memory address and one comprising the output from the selecting means for writing into the RAM the last N instruction and/or operand references, or any combination thereof. A circle counter has an input comprising the named output from the selecting means, for cycling the N references. Means are connected to the circle counter and to the RAM for replacing the oldest reference in the RAM by a new reference from the circle counter, that is, for updating the RAM. Means are connected to the updating means for reading out a specific instruction and/or operand reference.

4 Claims, 2 Drawing Figures

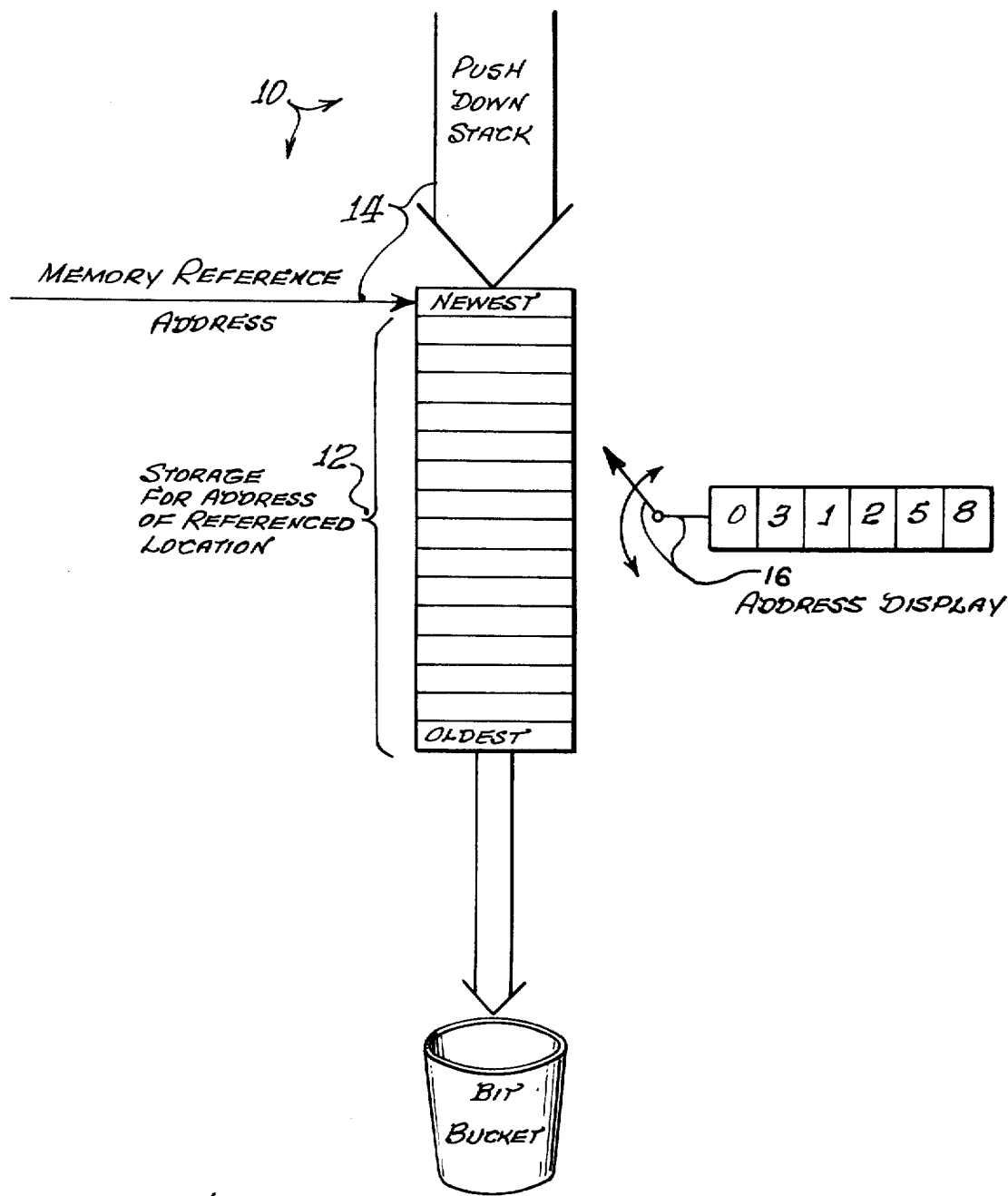
_FIG. 1._
FOOTPRINT MEMORY CONCEPT

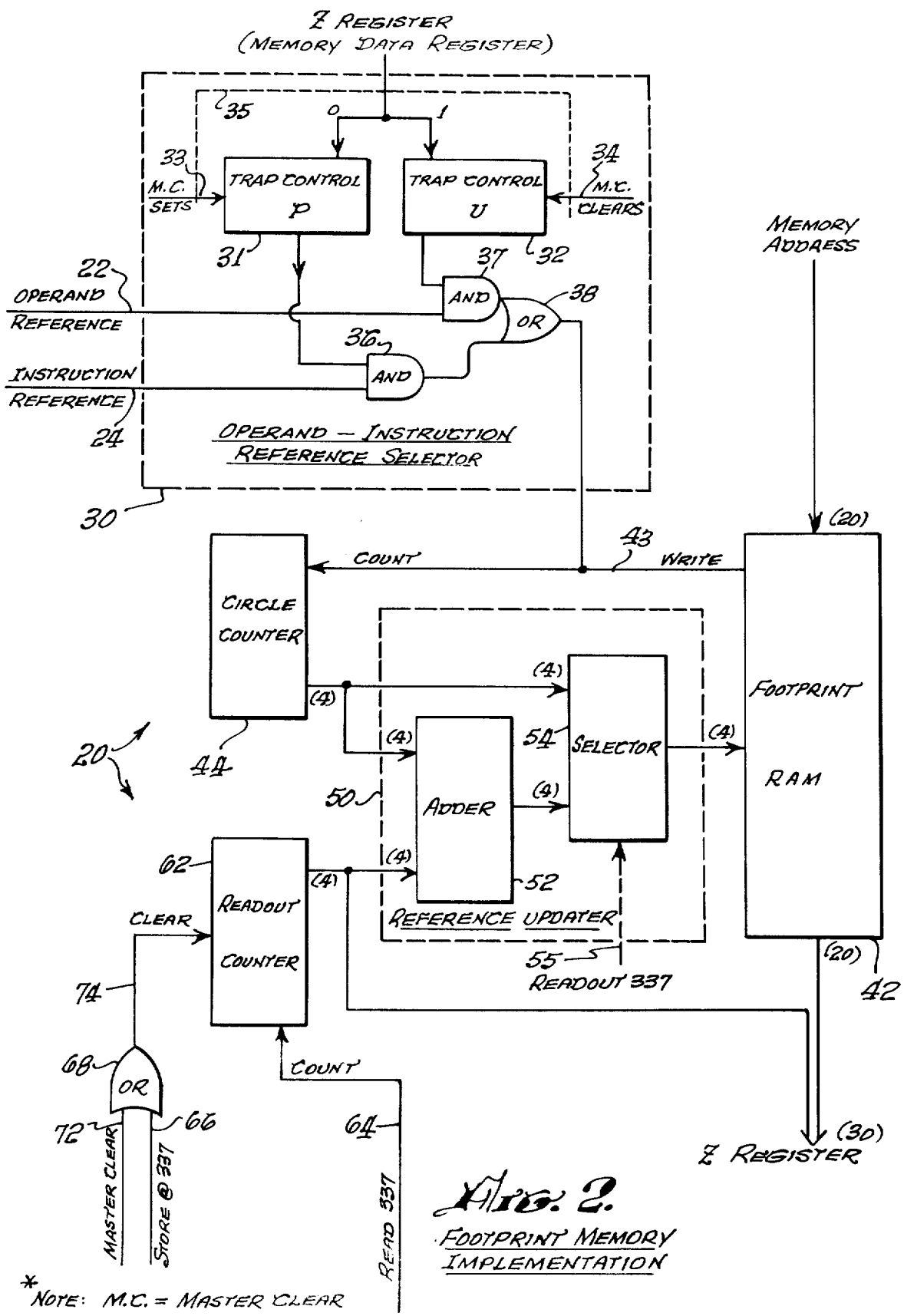

COMPUTER FOOTPRINT FILE

Statement of Government Interest

The invention described herein may be manufactured and used by or for the Government of the United States of America for governmental purposes without the payment of any royalties thereon or therefor.

BACKGROUND OF THE INVENTION

The purpose of the memory footprint of this invention is to provide the computer user with a convenient and efficient way to determine the actual path, when a program deviates from its expected path.

Traditional program debugging was done by hand execution of the program and occasional memory dumps to trace a program's progress. As programs became more complex and lengthy, a post-mortem dump was practical in all but the most persistent programming problems. In these cases it was necessary to tie up a computer (computer costs of $600/hr are not unusual) while the programmer executed the program at a humanly comprehendable speed, which is about one millionth the speed of which the machine is capable. The faster the machine, the more inefficient it is for a human to follow the program.

An automated technique for tracing deviant programs is known as a virtual machine, where each instruction is executed by the software of a virtual machine running in the hardware of the real machine. This interpretive execution requires several instruction executions for each instruction of the actual program to be run. Again the machine is being under-utilized due to the software overhead. No satisfactory scheme is available for real time applications. This is for several reasons: (1) The speed requirements do not often allow the virtual machine approach due to the execution inefficiency. (2) Even when a process can be run in a virtual machine it is not practical for standard operating procedures. (3) Real time situations cannot be easily, if ever, identically repeated to isolate a problem. This is especially true of multiprogramming and interruptable coding.

BACKGROUND OF THE INVENTION

A footprint memory consist of three major components: (1) A small fast memory for address storage. (2) Circuitry for selection and trapping addresses. (3) Circuitry for the read back or display of the trapped addresses. The first component can be easily made from semiconductor memories such as the common 4-bit by 16-word random access memory (RAM) integrated circuits. Since 16 words are most always sufficient, these can be put together in series to achieve the number of bits necessary for the address bits, and can be controlled by four selection lines.

The selection and trapping control determines if the memory reference is of the type to be trapped and writes into the RAM if the address is appropriate. The choice of which types to trap can be made by means of a switch or software set flip-flops. A four-bit binary counter is used to select words within the footprint RAM. The circle counter is bumped once for each selected reference. When the counter overflows to zero count starts ovver giving the effect of a circular storage file. The footprints can be retrieved either by software or hardware. Two implementations have been used. The first displays the footprint contents using light emitting diodes (LED) digital displays and the other allows the software to enter the footprints into the arithmetic register for automatic readup. In each case the footprint is selected by adding the footprint's *relative* (chronological) number to the value in the circular counter. See FIG. 2 for diagram of software implementation. For hardware readup, the desired footprint in manually selected instead of the readout counter which takes each one in turn when accessed by software.

A novel use of this invention is as a portable, self-contained, debugging device which contains all the electronics required. It is carried aboard ship and is used to aid debugging of difficult programs by plugging into the existing test points on a military computer. Using this technique, no modification to the computer is required. A "breakpoint" feature is also included in this device, so that when a thumbwheel-selected address is returned, the computer is caused to halt, whereupon the footprint file may be examined to determined the source of error.

OBJECTS OF THE INVENTION

An advantage of this invention is to provide a computer apparatus which provides hardware trace without extending hardware execution times.

Another object of the invention is to provide apparatus which is low-cost per installation and saves many man hours of effort to find computer and program errors.

Yet another object of the invention is to provide apparatus which can be in effect even when not "needed" without cost.

Still another object of the invention is to provide apparatus which can be added as a permanent machine feature or as a portable debugging tool.

Other objects, advantages and novel features of the invention will become apparent from the following detailed description of the invention, when considered in conjunction with the accompanying drawings, wherein:

BRIEF DESCRIPTION OF THE DRAWINGS

FIG. 1 is a diagrammatic view of the concept of the footprint memory.

FIG. 2 is a block diagram of an implementation of the footprint memory.

DESCRIPTION OF THE PREFERRED EMBODIMENTS

Referring now to FIG. 1, which shows the concept behind the invention, a footprint memory 10 consists of three major components: (1) A small fast memory 12 for address storage. (2) Circuitry 14 for selection and trapping address. (3) Circuitry 16 for the read back or display of the trapped addresses.

Referring now to FIG. 2, this figure shows an apparatus 20 for keeping track of the progress of a computer program by selecting specific operation and/or instruction references, comprising means 22 for accessing an operand reference and means 24 for accessing an instruction reference.

Means 30 are connected to a memory data register of the computer and to the two accessing means, 22 and 24, for selecting a specific operand or instruction reference which is to be monitored.

A random-acess memory (RAM) 42, herein termed a "footprint" memory, has three inputs, including one from a memory address and one comprising the output from the selecting means 30 for writing into the RAM the last N instruction and/or operand references, or any combination thereof. Writing is done into the footprint RAM 42, by lead 43, if the address is appropriate.

A circle counter 44 has an input comprising the named output from the selecting means 30, for cycling the N references. Means 50 are connected to the circle counter 44 and to the RAM 42 for replacing the oldest reference in the RAM by a new reference from the circle counter 44, that is, for updating the RAM.

Means 62 are connected to the updating means 50, for reading out a specific instruction and/or operand reference.

In the apparatus 20, the means 30 for selecting a specific reference comprises: an instruction trap control 31, connected to the memory data register, for trapping an instruction reference; and an operand trap control 32, also connected to the memory data register, for trapping an operation reference.

In FIG. 2, the two trap controls, 31 and 32, may be flip-flops. They are entitled "trap control P" and "trap control U" since the letter P has been traditionally used as the location of the instruction currently being executed, while the letter U has been used for the address operand currently being operated on.

Meand must be provided for setting or clearing the trap controls, 31 and 32. The means are indicated in FIG. 2 by the line 33 indicating "M.C. sets" and the line 34 indicating "M.C. clears" as well as the dashed line 35 indicating that these two lines may be activated simultaneously.

The abbreviation M.C. stands for "master clear", which means to put into a quiescent state so that it is in a known-default state. If the master clear is energized, it will set the trap P control 31, that is, start trapping instruction references and it will clear trapping of the operand references. This was the most likely desired case if a deliberate decision was not feasible. The master clear may be a button on the control of the computer which simultaneously sets trap control P, 31, and clears trap control U, 32.

Still discussing FIG. 2, and specifically the operand-instruction reference selector 30, it further comprises a first AND circuit 36, whose two inputs are connected to the output of the instruction trap control 31 and to an instruction reference from the computer; and a second AND circuit, whose two inputs are connected to the output of the operand trap control 32 and to an operand reference from the computer. An OR circuit 38 has two inputs which are connected to the outputs of the two AND circuits, 36 and 37, its output comprising one of the inputs to the RAM 42 and the input to the circle counter 44.

In the apparatus 20, the updating means may comprise an adder 52, having one input connected to the output of the circle counter 44 and another input connected to the output of the readout means 62, the adder output constituting a footprint address. A selector circuit 54 has one input connected to an output of the readout means 62, and another input connected to the output of the circle counter, the selector providing a means for reading out a selected footprint memory address.

Discussing now the mode of operation of the invention in more detail, the footprint memory implementation 20 of FIG. 2 includes flip flops, counters, and gates which control the footprint memory 42. This memory 42 saves the last 16 instruction and/or operand references. The contents of the memory 42 are accessed by reading address 337, over lead 64. For each read the 20-bit address is placed on lines 0 through 19. The footprint address is put on lines 24 through 27. The first read over lead 64 gives the oldest 20-bit address and a footprint address of 17 octal. The next read steps forward one 20-bit address and gives a 16 octal. The last address saved is accessed on the sixteenth read and has a value of zero in bits 24 to 27. Special circuitry must be enabled to read from the footprint memory 42.

Storing into address 337 over lead 66 controls what is saved by the footprint memory 42. If bit zero and bit one are both zero, nothing more is saved and the memory 42 is ready to be read. If bit zero is a one, instruction addresses will be saved. If bit one is a one, operand addresses will be saved. If both bits are one, both types of addresses will be saved. When the computer is master cleared, by lead 72, the circuitry 20 is set to save instruction references only, with bit zero set to one.

First and second flip flops, not shown, control what is saved. Master clear, by means of lead 72, will set the first flip-flop and clear the second flip-flop by means of an OR gate. Master clear also clears the readout counter 62, by means of lead 74. A store into address 337, by means of lead 66, will gate bit zero and bit one into the first and second flip-flops. When the clock line on pins 3 and 13 goes high, the data on pins 2 and 14 are stored in the flip-flops. Gate 38 takes the output of these two flip-flops, 36 and 37, anded with instruction and operand references, over leads 22 and 24. The output of gate 38 must be low if the footprint memory 42 is to be written into, by lead 43.

The circle counter 44 is a four-bit binary counter which controls the store address. After each store cycle, it is advanced one count by a pulse through a gate connected to the output of OR gate 38 and located in circle counter 44. As long as either the first or second flip-flop is set, circle counter 44 continues to cycle through its 16 counts, always replacing the oldest data with new in the footprint memory 42.

When the first and second flip-flops are cleared, footprint readout can be initiated. After counter 44 points to the oldest data address, it does not count any farther. Counter 62 will be cleared because of a previous store into address 337, by lead 66, or a master clear, by lead 72. When 337 is read, by lead 64, a gate in read-out counter 62 will go high, selecting the adder 52 output as the footprint address through selector 54. The output of the adder 52 is the sum of counters 44 and 62. For the first read, counter 62 is zero and the oldest data is selected. A set of four flip-flops gate the complement of counter 62 onto the data bus, bits 24 through 27. The footprint memory data is put on the data bus, bits 0 through 19. The data bus is read into the Z register. At the end of the read, counter 62 counts up by one. The adder 52 output is now increased by one and the next read comes from the next address. After 16 reads of 337, by lead 64 the sequence repeats.

The footprint memory in made up of five integrated circuit modules, each having 16 words of four bits. They are configured as 16 words of 20 bits. The enable, write, and address lines go to all five modules in parallel. The 20 data inputs come from the modified 20-bit address with a high signifying a one. The outputs go to the first 20 bits of the data bus. The output is inverted from the input; so low implies a one.

The memory enable line is low only during references to address 337. At all other times the outputs present a high impedance to the data bus. The write line is low only for write operations at address 337. The address lines select one of sixteen addresses, as described hereinabove.

Obviously many modifications and variations of the present invention are possible in the light of the above teachings. It is therefore to be understood that within the scope of the appended claims the invention may be practiced otherwise than as specifically described.

What is claimed is:

1. Apparatus for keeping track of the progress of a computer program by selecting specific operand and/or instruction references, comprising:
   means for accessing an operand reference;
   means for accessing an instruction reference;
   means connected to a memory data register of the computer and to the two accessing means for selecting a specific operand or instruction reference which is to be monitored;
   a random-acess memory (RAM), having three inputs, including one from a memory address and one comprising the output from the selecting means for writing the last N instruction and/or operand references, or any combination thereof into the RAM;
   a circle counter having an input comprising the same output from the selecting means, for cycling the N references;
   means connectd to the circle counter and the RAM of replacing the oldest reference in the RAM by a new reference from the circle counter, that is, for updating the RAM; and
   means connected to the updating means for reading out a specific instruction and/or operand reference.

2. The apparatus according to claim 1 wherein the means for selecting a specific reference comprises:
   an instruction trap control, connected to the memory data register, for trapping an instruction reference;
   an operand trap control, also connected to the memory data register, for trapping an operand reference;
   means for setting or clearing the trap controls;
   a first AND circuit, whose two inputs are connected to the output of the instruction trap control and to an instruction reference from the computer;
   a second AND circuit, whose two inputs are connected to the output of the operand trap control and to an operand reference from the computer; and
   an OR circuit, whose two inputs are connected to the outputs of the two AND circuits and whose output comprises one of the inputs to the RAM and the input to the circle counter.

3. The apparatus according to claim 1 wherein the updating means comprises:
   an adder, having one input connected to the circle counter and another input connected to the output of the readout means, the adder output constituting a footprint memory address; and
   a selector circuit, having one input connected to an output of the readout means, and another input connected to the output of the circle counter, the slector providing a means for reading out a selected footprint memory address.

4. The apparatus according to claim 2, werein the updating means comprises:
   an adder, having one input connected to the circle counter and another input connected to the output of the readout means, the adder output constituting a footprint memory address; and
   a selector circuit, having one input connected to an output of the readout means, and another input connected to the output of the circle counter, the selector providing a means for reading out a selected footprint memory address.

* * * * *